United States Patent
Scholtes et al.

(10) Patent No.: US 10,598,191 B2
(45) Date of Patent: Mar. 24, 2020

(54) VANE FOR TURBOMACHINERY, SUCH AS AN AIRCRAFT TURBOJET OR TURBOFAN ENGINE OR AN AIRCRAFT TURBOPROP ENGINE

(71) Applicant: Safran Aircraft Engines, Paris (FR)

(72) Inventors: Christophe Scholtes, Moissy-Cramayel (FR); Cedric Michel Claude Chretien, Moissy Cramayel (FR); Thomas Nolwenn Emmanuel Delahaye, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 277 days.

(21) Appl. No.: 15/585,942

(22) Filed: May 3, 2017

(65) Prior Publication Data
US 2017/0328379 A1    Nov. 16, 2017

(30) Foreign Application Priority Data
May 12, 2016  (FR) ..................... 16 54239

(51) Int. Cl.
| F01P 7/06 | (2006.01) |
| F04D 29/56 | (2006.01) |
| F01D 25/02 | (2006.01) |
| F02C 7/047 | (2006.01) |
| F01D 17/16 | (2006.01) |
| F01D 9/06 | (2006.01) |
| F01D 5/18 | (2006.01) |
| F02K 3/04 | (2006.01) |
| F04D 29/54 | (2006.01) |
| F04D 29/58 | (2006.01) |

(52) U.S. Cl.
CPC ............. *F04D 29/563* (2013.01); *F01D 5/18* (2013.01); *F01D 9/065* (2013.01); *F01D 17/162* (2013.01); *F01D 25/02* (2013.01); *F02C 7/047* (2013.01); *F02K 3/04* (2013.01); *F04D 29/544* (2013.01); *F04D 29/582* (2013.01); *F05D 2220/323* (2013.01); *F05D 2240/12* (2013.01); *Y02T 50/676* (2013.01)

(58) Field of Classification Search
CPC .......... F02C 7/047; F02C 6/08; F01D 17/162; F01D 25/02; F01D 9/065; Y02T 50/676
USPC ......................................................... 416/39
See application file for complete search history.

(56) References Cited

U.S. PATENT DOCUMENTS 2,927,725 A    3/1960 Rainbow
3,123,283 A *  3/1964 Leis ..................... F01D 17/162
                                           415/115

(Continued)

FOREIGN PATENT DOCUMENTS

FR           2 936 560 A1    4/2010
WO    WO 2014/052744 A1     4/2014
WO    WO 2015/112268 A2     7/2015

*Primary Examiner* — Long T Tran
*Assistant Examiner* — James J Kim
(74) *Attorney, Agent, or Firm* — Blank Rome LLP

(57) ABSTRACT

A vane for turbomachinery, such as, for example, an aircraft turbojet or turbofan engine, or an aircraft turboprop engine. The vane includes: (i) a first deicing fluid flow circuit inside the vane; (ii) a second deicing fluid flow circuit inside the vane; and (iii) a selector for directing the majority of the fluid towards the first circuit when the turbomachinery is in a first operating state, and for directing the majority of the fluid towards the second circuit when the turbomachinery is in a second operating state.

6 Claims, 4 Drawing Sheets

(56) References Cited

U.S. PATENT DOCUMENTS

| | | | | |
|---|---|---|---|---|
| 4,883,404 A | * | 11/1989 | Sherman | B21H 7/16 |
| | | | | 415/115 |
| 5,029,440 A | * | 7/1991 | Graber | F02C 7/047 |
| | | | | 244/134 B |
| 6,485,255 B1 | | 11/2002 | Care et al. | |
| 10,113,444 B2 | * | 10/2018 | Huang | F01D 9/065 |
| 2009/0196737 A1 | | 8/2009 | Mitchell | |
| 2014/0271101 A1 | * | 9/2014 | Slavens | F01D 5/187 |
| | | | | 415/1 |
| 2018/0045116 A1 | * | 2/2018 | Schenk | F02C 7/185 |

* cited by examiner

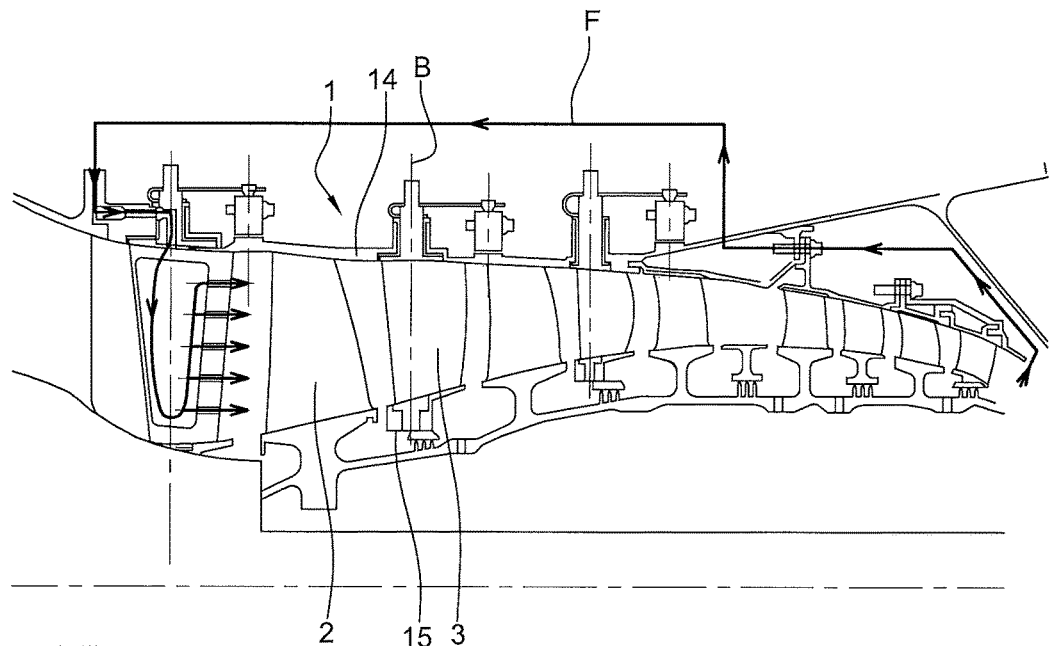
Fig. 1
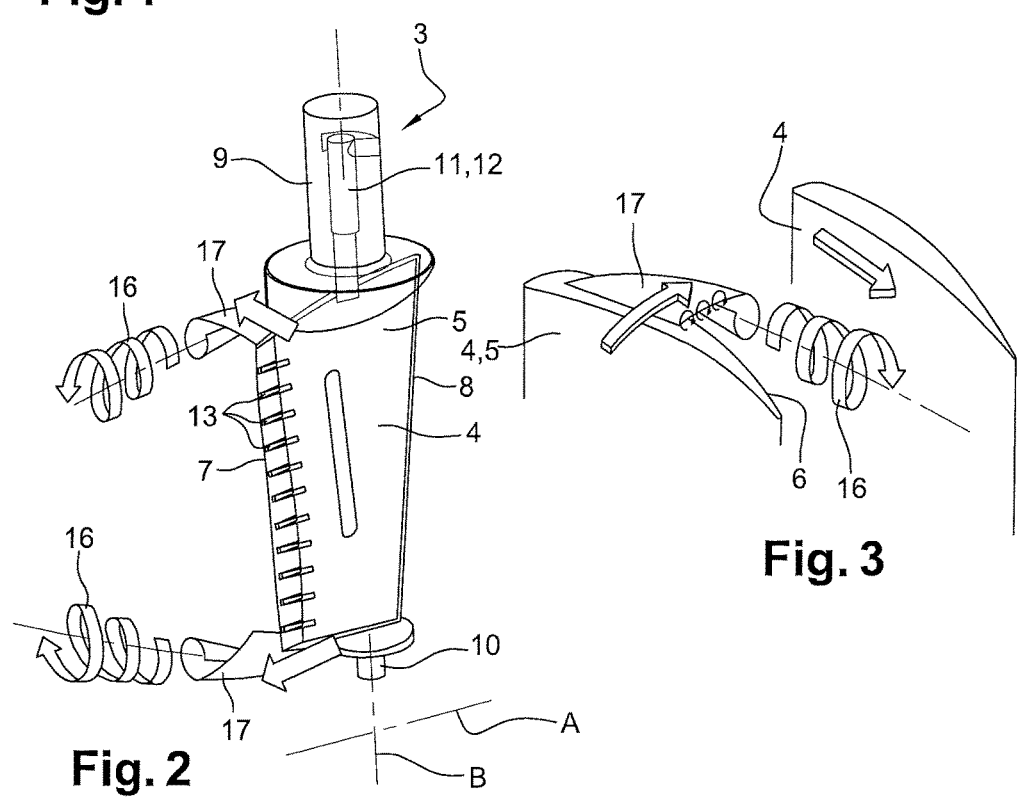
Fig. 2
Fig. 3

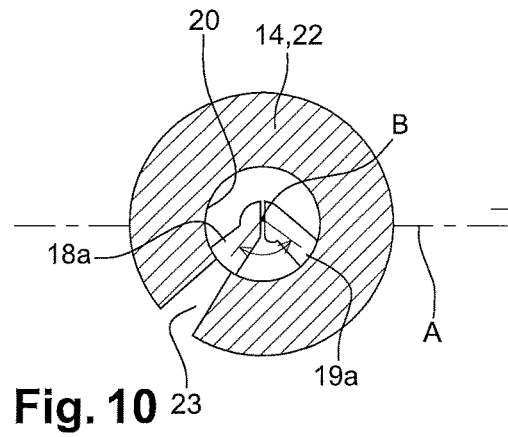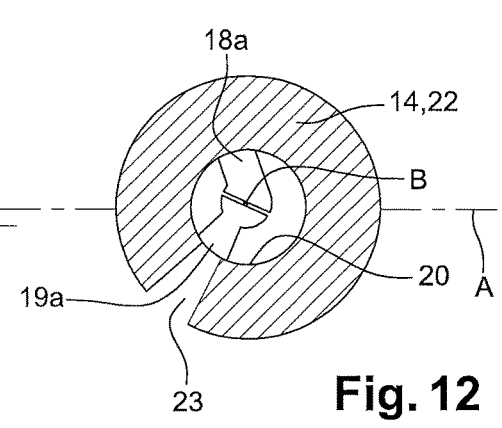
Fig. 10  Fig. 12
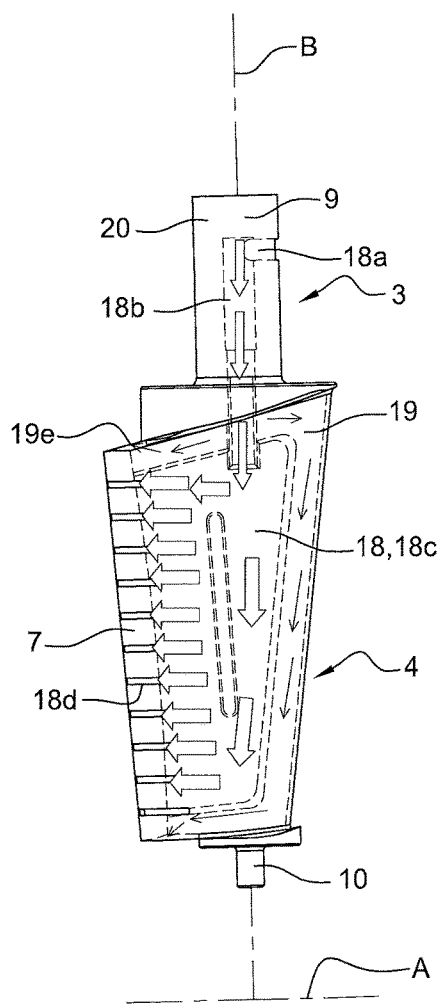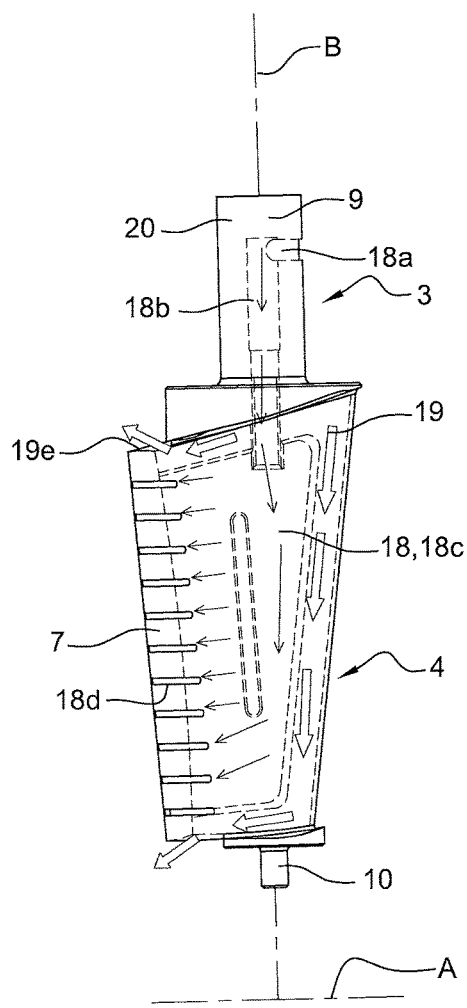
Fig. 11  Fig. 13

VANE FOR TURBOMACHINERY, SUCH AS AN AIRCRAFT TURBOJET OR TURBOFAN ENGINE OR AN AIRCRAFT TURBOPROP ENGINE

BACKGROUND OF THE INVENTION

1. Field of the Invention

The present invention relates to a vane for turbomachinery, such as, for example, an aircraft turbojet or turbofan engine, or an aircraft turboprop engine.

2. Description of the Related Art

Going from upstream to downstream in the direction in which the gases flow through it, a dual-flow turbojet or turbofan conventionally comprises a fan, a low-pressure compressor, a high-pressure compressor, a combustion chamber, a high-pressure turbine, a low-pressure turbine, and an exhaust nozzle through which the gases are discharged. The high-pressure compressor and turbine are secured to a common shaft, referred to as the "high-pressure shaft", and are thus part of the high-pressure body of the engine, while the low-pressure compressor and turbine are secured to a common shaft referred to as the "low-pressure shaft", and are thus part of the low-pressure body of the engine.

A fraction of the air flow driven by the fan, and referred to as the "primary flow" or as the "hot flow", is driven towards the portions of the core of the turbojet or turbofan, namely towards the low-pressure and high-pressure compressors, the combustion chamber, and the high-pressure and low-pressure turbines. On exiting from the fan, the remainder of the air flow, referred to as the "secondary flow" or "cold flow" is discharged directly into a secondary nozzle situated between the outer casing of the core of the turbojet or turbofan and the nacelle thereof. A fraction of the secondary flow may optionally be re-injected into the primary flow for cooling purposes, for example, but the majority of said secondary flow is used only to obtain the thrust of the turbojet or turbofan. In dual-flow turbojets or turbofans for civilian use, the thrust of the turbojet or turbofan comes mainly from the secondary flow.

As can be seen in FIG. 1, the high-pressure compressor 1 has one or more compression stages, each stage having a wheel of moving vanes or "blades" 2 and a wheel of fixed vanes 3. Each wheel 2, 3 is made up of a plurality of vanes or blades extending radially relative to the axis A of the turbomachinery and distributed about said axis A.

It is known that the wheel of fixed vanes 3 can be equipped with Variable Stator Vanes (VSVs). For example, vanes of this type are described in Applicant's Document FR 2 936 560.

A vane 3 of this type is shown in FIG. 2. Each vane 3 comprises a blade portion 4 having a concave surface 5 and a convex surface 6 (FIG. 3) that are interconnected by a trailing edge 7 and by a leading edge 8 that are mutually opposite. The blade portion 4 extends along an axis B, a pivot 9, 10 extending along the axis B of the blade portion 4, from each axial end of said blade portion 4.

In certain flight phases (ascent, descent, and approach) some of the vanes 3 of the compressor can be subjected to "icing conditions", in particular for an ambient temperature less than or equal to 0° C., and while the aircraft is passing through a cloud of supercooled water. Such conditions can give rise to accumulation of ice, thereby degrading the performance of the turbomachinery. In addition, in such conditions, blocks of ice can become detached and can damage the portions of the turbomachinery that are situated downstream.

It should be noted that the same phenomenon can also be observed in a turboprop, for example, in particular at the compressor or at the variable inlet guide vanes.

In order to avoid such icing, it is known, for example, that an air-flow circuit 11 can be provided inside the blade portion 4. The circuit has an air inlet 12 situated, for example, at the pivot 9, the circuit 11 also having a plurality of air outlets 13 distributed along the trailing edge 7.

The zones of assembly clearance between the variable stator vanes and the corresponding casings or shells 14, 15 (FIG. 1) can generate turbulence 16. Due to the pressure difference between the concave surfaces 5 and the convex surfaces 6 of the vanes, sheets of vortices 17 passing circumferentially through the above-mentioned clearance zones can flow from the higher-pressure zones to the lower-pressure zones (FIGS. 2 and 3). Such sheets 17 generate turbulence 16 downstream from said clearance zones, thereby adversely affecting the efficiency of the turbomachinery.

SUMMARY OF THE INVENTION

An object of the invention is to provide a solution to the above-noted problems that is simple, effective, and inexpensive.

To this end, the invention provides a vane for turbomachinery, such as, for example, an aircraft turbojet or turbofan engine, or an aircraft turboprop engine, the vane including:
  a first deicing fluid flow circuit inside the vane;
  a second deicing fluid flow circuit inside the vane; and
  selection means suitable for directing the majority of the fluid towards the first circuit, when the turbomachinery is in a first operating state, and suitable for directing the majority of the fluid towards the second circuit, when the turbomachinery is in a second operating state.

The distinct circuits may, in particular, make it possible for fluid to flow through distinct zones of the blade portion, as a function of the various operating states of the turbomachinery. For example, the fluid is a deicing fluid, such as deicing air. The air may be taken at the outlet of the compressor, for example, where it is hotter than at the inlet of the compressor.

The vane may be a variable stator vane and may comprise a blade portion having a concave surface and a convex surface that are interconnected by a trailing edge and by a leading edge that are mutually opposite, said blade portion extending along an axis, and a pivot extending along the axis of the blade portion, from at least one axial end of said blade portion.

In which case, the first circuit and the second circuit may be provided respectively with a first fluid inlet and with at least one second fluid inlet, which inlets are situated at said pivot, the first and second fluid inlets being offset angularly relative to each other, the first fluid inlet and the second fluid inlet being part of the selection means. In this way, a casing of the turbomachinery may be provided with a fluid injection orifice or zone, designed to be situated facing the inlet of the first circuit, in a first operating state, and designed to be situated facing the inlet of the second circuit, in a second operating state. The two operating states then correspond to two different angular positions or settings for the vane, about the axis of said vane.

The vane may further include a deflection channel, e.g. a groove, extending from the first inlet to the second inlet.

The fluid may thus feed one of the circuits to a majority extent, and the other circuit to a lesser extent.

The cross-sectional area of the deflection channel lies in the range 10% to 20% of the cross-sectional area of the first fluid inlet and/or of the second fluid inlet.

The first circuit may have at least one fluid outlet opening out at the trailing edge.

In particular, the first circuit may have a plurality of fluid outlets distributed axially along the trailing edge.

In a variant, the fluid outlets may open out in the concave surface and/or in the convex surface of the blade portion.

The second circuit may have at least one fluid outlet opening out at one of the axial ends of the blade portion, e.g. in the vicinity of the trailing edge and/or in the vicinity of the leading edge.

The fluid, e.g. air, coming from the outlet of the second circuit prevents the flow of the sheet of vortices usually generated circumferentially in the zones of assembly clearance. Turbulence is thus limited downstream from the corresponding zone of clearance in such a manner as to increase the efficiency of the turbomachinery.

Preferably, the second circuit may have at least one fluid outlet opening out at each axial end of the blade portion, e.g. in the vicinity of the trailing edge and/or in the vicinity of the leading edge.

The invention also provides turbomachinery, such as, for example, an aircraft turbojet or turbofan engine, or an aircraft turboprop engine, including at least one vane of the above-mentioned type.

BRIEF DESCRIPTION OF THE DRAWINGS

The invention will be better understood and other details, characteristics, and advantages of the invention will appear on reading the following description given by way of non-limiting example and with reference to the accompanying drawings, in which:

FIG. 1 is a half-view in section through a prior art turbojet or turbofan;

FIG. 2 is a perspective view showing a prior art variable stator vane and the turbulence generated at the zones of assembly clearance for assembling the vane;

FIG. 3 is a perspective view showing two vanes and the turbulence generated at the zones of assembly clearance;

FIG. 10 is a diagrammatic view in section on a plane perpendicular to the axis B of the vane, showing the positions of the inlets of the circuits, in a first operating state;

FIG. 11 is a face view of the vane of the invention, showing the flows of fluids in the two circuits, when the turbomachinery is in a first operating state; and FIGS. 12 and 13 are views corresponding respectively to FIGS. 10 and 11, showing the turbomachinery in a second operating state.

DETAILED DESCRIPTION OF THE PREFERRED EMBODIMENTS

Figure 4:
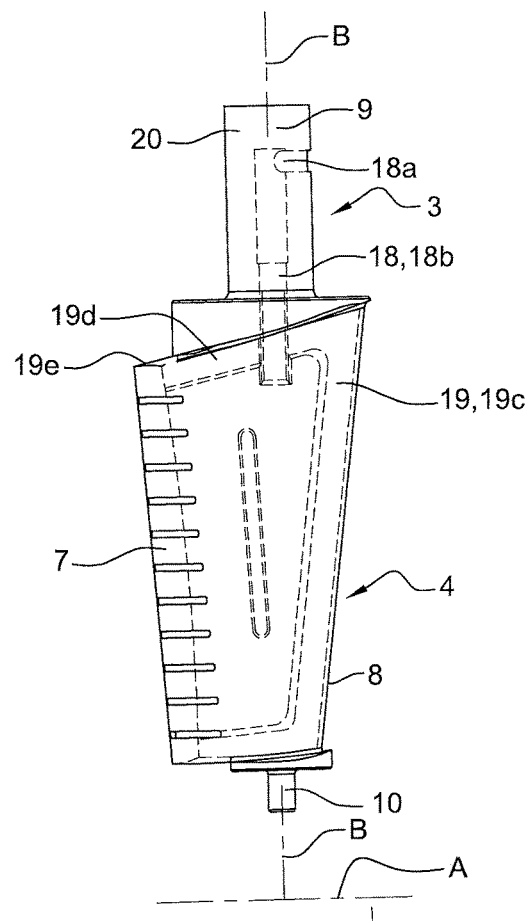
FIG. 4 is a face view of a variable stator vane in an embodiment of the invention.
Figure 5:
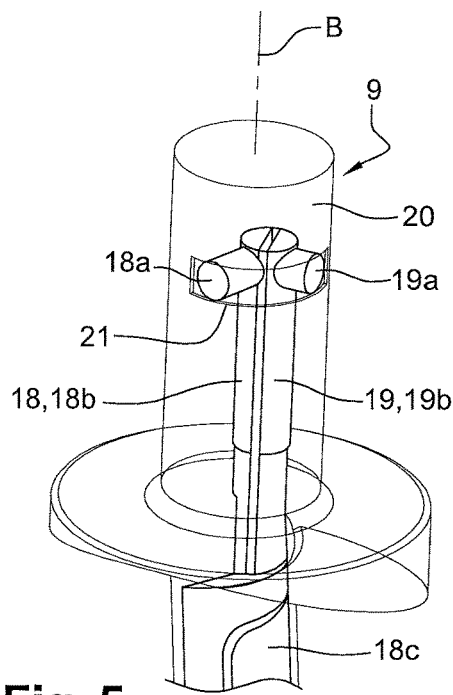
FIG. 5 is a perspective view of the pivot of the vane shown in FIG. 4.
Figure 6:
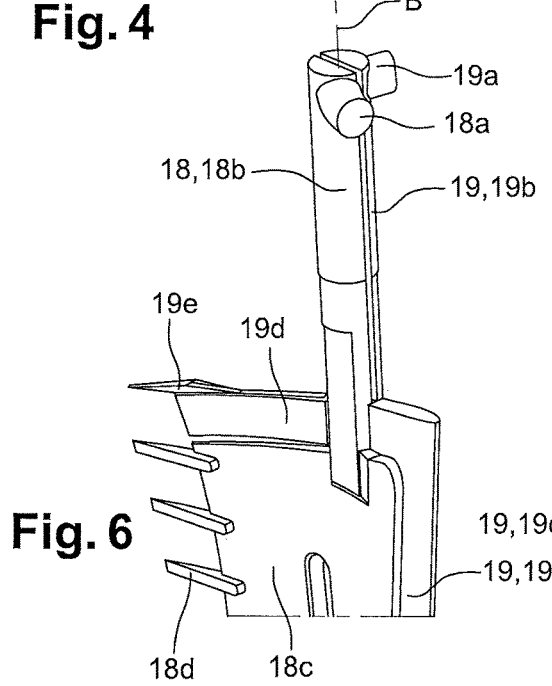
FIGS. 6 and 7 are views showing a portion of the two circuits in the vane of the invention.
Figure 7:
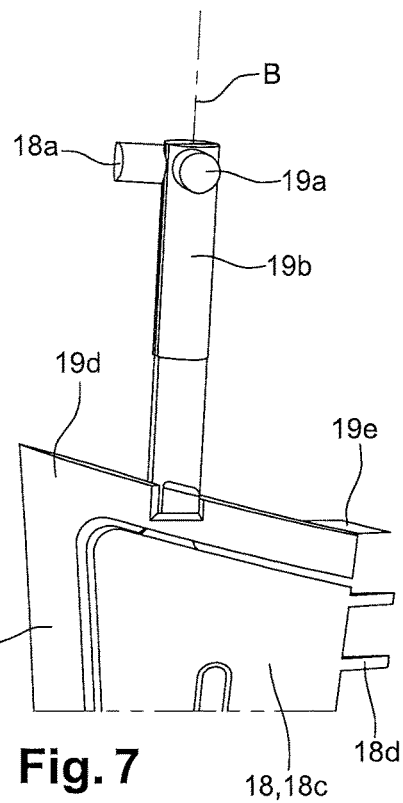
Figure 8:
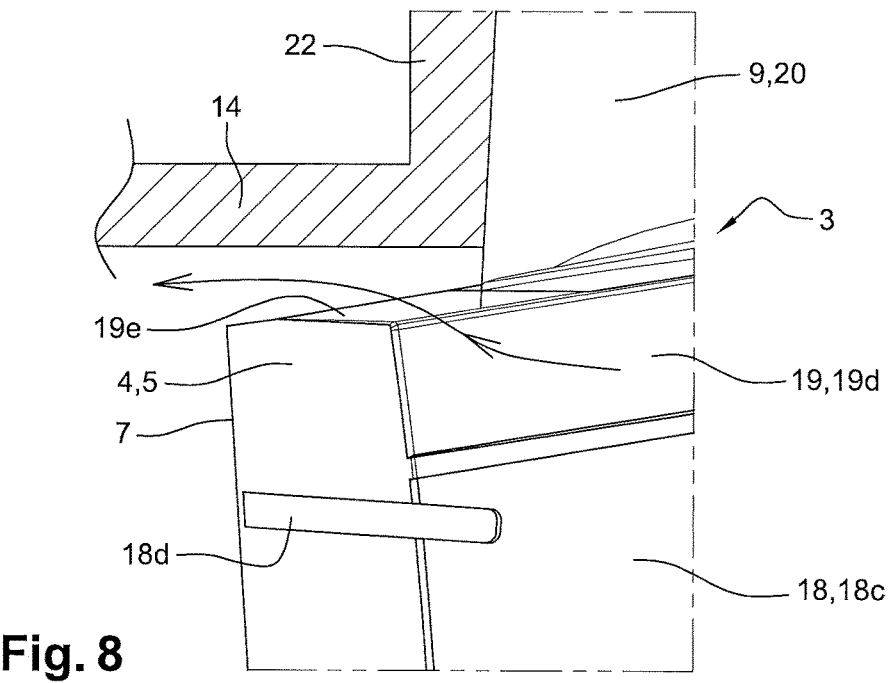
FIG. 8 is a detail view of FIG. 4, with the casing being shown diagrammatically.
Figure 9:
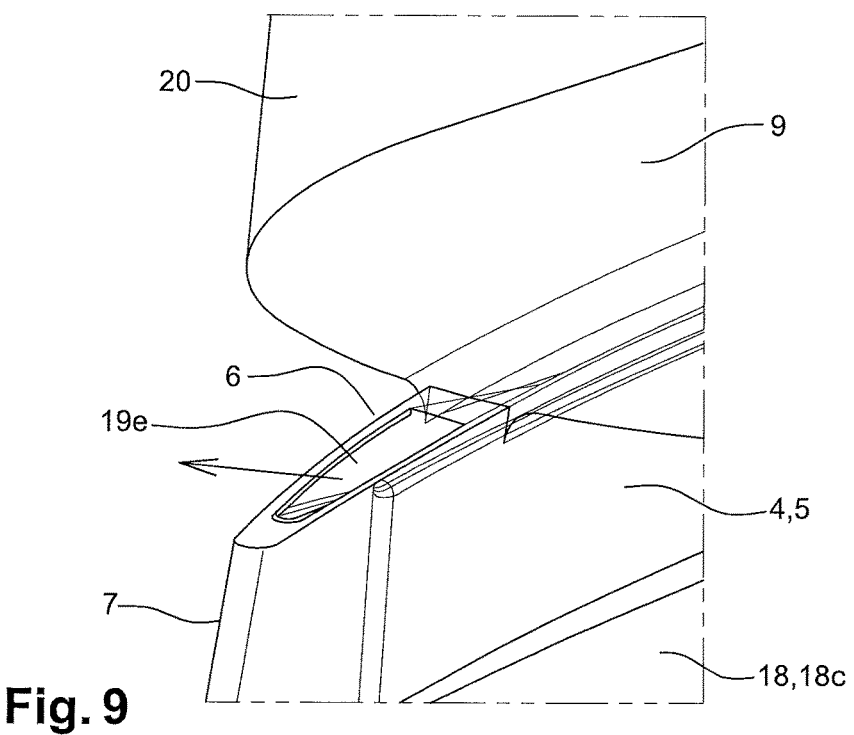
FIG. 9 is a perspective view showing an outlet of the second channel.

FIGS. 4 to 13 show a variable stator vane 3 in an embodiment of the invention.

The vane extends along an axis B, which, for example, is perpendicular to the axis A of the turbomachinery. For example, the vane 3 is designed to equip a wheel of a stage of the high-pressure compressor of a turbojet or turbofan. The vane 3 includes a blade portion 4 having a concave surface 5 and a convex surface 6 that are interconnected by a trailing edge 7 and by a leading edge 8 that are mutually opposite, the trailing edge 7 being situated downstream and the leading edge 8 being situated upstream, in the direction in which the gases flow through the turbomachinery.

A first cylindrical pivot 9 of axis B extends from a first end of the blade portion 4 radially outwards relative to the axis A of the turbomachinery. A second cylindrical pivot 10 of axis B extends from a second end of the blade portion 4 radially inwards relative to the axis A.

Each pivot 9, 10 is designed to be engaged in a bearing of complementary shape provided in a casing 14 or a shell 15 (FIG. 1).

A first circuit 18 and a second circuit 19 are provided inside the vane 3. The circuits 18, 19 serve, in particular for enabling a de-icing fluid to flow through them, such as hot air taken from the outlet of the high-pressure compressor, for example.

The first circuit 18 includes an inlet comprising a first portion 18a that extends radially relative to the axis B, that is extended by a second portion 18b extending along the axis B, and that opens out into an internal chamber 18c inside the blade portion 4. Outlet channels 18d extend perpendicularly to the axis B from the chamber 18c to the trailing edge 7 where they open out into the course of the stream of the primary flow of the turbojet or turbofan. The outlet channels 18d are distributed uniformly along the trailing edge 7.

For example, the chamber 19c is generally O-shaped and extends over the majority of the height and of the width of the blade portion 4. The "height" of the blade portion 4 is defined as being the dimension of the blade portion 4 along the axis B. The "width" of the blade portion 4 is defined as being the dimension of the blade portion 4 along the axis A of the turbomachinery.

The second circuit 19 includes an inlet comprising a first portion 19a that extends radially relative to the axis B, that is extended by a second portion 19b extending along the axis B, and that opens out into an internal chamber inside the blade portion 4, which chamber is generally C-shaped with one of its branches 19c extending at the leading edge of the vane, and its other two branches 19d extending from the ends of the branch 19c. The branches 19d extend along the axial ends of the blade portion 4 and open out via openings 19e situated in the vicinity of the trailing edge 7. In a variant (not shown), the openings 19e can be situated in the vicinity of the leading edge 8.

The openings 19e thus open out facing the zones of assembly clearance between the blade portion 4 and the corresponding casings or shells.

The first portions 18a, 19a of the inlets of the circuits 18, 19 extend perpendicularly to the axis B and are offset angularly relative to each other, by an angle α lying in the range 50° to 80°. For example, the first portions 18a, 19a have round cross-sections and open out in the cylindrical peripheral surface 20 of the pivot 9. As can be seen more clearly in FIG. 5, a groove 21 that extends circumferentially is provided in said surface 20, which groove 21 interconnects the openings of the first portions 18a, 19a of the first and second circuits 18, 19. For example, the cross-sectional area of the groove 21 lies in the range 10% to 20% of the cross-sectional area of each of the first portions 18a, 19a. In this example, the first portions 18a, 19a are of substantially the same cross-sectional area.

The second portions 18b, 19b have semicircular cross-sections that face in opposite directions relative to each other.

Operation of such a vane 3 is described below with reference to FIGS. 10 and 13.

When the turbomachinery is in a first operating state, namely at low engine speed, the vane 3 is oriented at a first setting shown in FIGS. 10 to 11. In this position, the bearing 22 of the casing 14 is equipped with a deicing air injection orifice 23 that opens out facing the inlet 18a of the first circuit. A majority of the flow rate of deicing air coming from the injection orifice 23 thus penetrates into the first circuit 18 before it is removed via the outlet channels 18d at the trailing edge 7. That air tends to be effective in heating almost all of the vane 3, and in particular almost all of the blade portion 4, in such a manner as to obtain effective deicing of the vane 3.

In this position, only a small portion of the flow rate of deicing air, e.g. in the range 10% to 20% of the flow rate of air coming from the injection orifice 23 penetrates into the second circuit 19 through the groove 21 and exits before being removed via the outlet openings 19e facing the zones of assembly clearance.

It should be noted that, at low engine speed, the turbulence generated at the zones of assembly clearance between the axial ends of the blade portion 4 and the corresponding casings 14 or shells 15 is relatively small, so that the efficiency of the turbomachinery is hardly adversely affected by such turbulence.

When the turbomachinery is in a second operating state, namely at high engine speed, the vane 3 is oriented at a second setting shown in FIGS. 12 and 13.

In this position, the deicing air injection orifice 23 of the bearing 22 of the casing opens out facing the inlet 19a. A majority of the deicing air flow rate coming from the nozzle 23 then penetrates into the second circuit 19 before being removed via the outlet openings 19e facing the zones of assembly clearance.

This air thus tends to reduce or indeed prevent the appearance of sheets of vortices 17 or of turbulence 16 at the zones of assembly clearance between the ends of the blade portion 4 and the casing 14 or the shell 15, in such a manner as to significantly improve the efficiency of the turbomachinery.

In this position, only a small fraction of the flow rate of deicing air, e.g. in the range 10% to 20% of the flow rate of air coming from the injection orifice 23 penetrates into the first circuit 18 through the groove 21 before being removed at the trailing edge 7 via the outlet channels 18d.

It should be noted that the risk of ice appearing at high engine speeds is limited. It is then not necessary to cause a high flow rate of fluid to flow through the first circuit 18. In addition, at high engine speeds, the pressure downstream from the compressor, i.e. where the air is taken, is relatively high, so that even a small through cross-sectional area offers an air flow rate that is high enough through the first circuit 18.

Naturally, other selection means may be provided for feeding the circuits 18 and 19, such as, for example, valves.

The invention claimed is:

1. A variable stator vane for turbomachinery, such as, for example, an aircraft turbojet or turbofan engine or an aircraft turboprop engine, said vane comprising a blade portion having a concave surface and a convex surface that are interconnected by a trailing edge and by a leading edge that are mutually opposite, said blade portion extending along an axis (B), and a pivot extending along the axis (B) of the blade portion, from at least one axial end of said blade portion, said variable stator vane being characterized in that it further comprises:
   a first deicing fluid flow circuit inside the vane;
   a second deicing fluid flow circuit inside the vane;
   selection means suitable for directing the majority of a fluid towards the first circuit, when the vane is in a first angular position, about the axis (B), corresponding to the turbomachinery being in a first operating state, and suitable for directing the majority of the fluid towards the second circuit, when the vane is in a second angular position, about the axis, corresponding to the turbomachinery being in a second operating state, wherein the selection means includes a first fluid inlet for the first deicing fluid flow circuit and a second fluid inlet for the second deicing fluid flow circuit, wherein the first fluid inlet and the second fluid inlet are situated at the pivot and are offset angularly relative to each other; and
   a groove extending from the first inlet to the second inlet.

2. The vane according to claim 1, wherein the first circuit has at least one fluid outlet opening out at the trailing edge.

3. The vane according to claim 2, wherein the first circuit has a plurality of fluid outlets distributed axially along the trailing edge.

4. The vane according to claim 1, wherein the second circuit has at least one fluid outlet opening out at one of the axial ends of the blade portion in the vicinity of the trailing edge and/or in the vicinity of the leading edge.

5. The vane according to claim 4, wherein the second circuit has a fluid outlet opening out at each axial end of the blade portion in the vicinity of the trailing edge and/or in the vicinity of the leading edge.

6. Turbomachinery in the form of an aircraft turbojet or turbofan engine or an aircraft turboprop engine, including the vane according to claim 1.

* * * * *